US012121918B2

(12) United States Patent
Zembrod

(10) Patent No.: US 12,121,918 B2
(45) Date of Patent: Oct. 22, 2024

(54) COMPRESSIBLE MECHANISM FOR EXTRACTING FLUID PRODUCTS FOR A RANGE OF PACKAGING

(71) Applicant: Eric Zembrod, Boituva (BR)

(72) Inventor: Eric Zembrod, Boituva (BR)

( * ) Notice: Subject to any disclaimer, the term of this patent is extended or adjusted under 35 U.S.C. 154(b) by 151 days.

(21) Appl. No.: 17/796,766

(22) PCT Filed: Feb. 4, 2020

(86) PCT No.: PCT/BR2020/050025
§ 371 (c)(1),
(2) Date: Aug. 1, 2022

(87) PCT Pub. No.: WO2021/155449
PCT Pub. Date: Aug. 12, 2021

(65) Prior Publication Data

US 2023/0074980 A1 Mar. 9, 2023

(51) Int. Cl.
*B05B 11/00* (2023.01)
*B05B 11/10* (2023.01)
*F04B 45/02* (2006.01)

(52) U.S. Cl.
CPC ........ *B05B 11/104* (2023.01); *B05B 11/1069* (2023.01); *B05B 11/1074* (2023.01); *B05B 11/1077* (2023.01); *F04B 45/02* (2013.01)

(58) Field of Classification Search
CPC ............... B05B 11/104; B05B 11/1069; B05B 11/1074; B05B 11/1077; B05B 11/1067; B05B 11/1023; F04B 45/02; B65D 83/20; B65D 83/30; B65D 83/32; B65D 83/44
See application file for complete search history.

(56) References Cited

U.S. PATENT DOCUMENTS 5,924,603 A * 7/1999 Santagiuliana ..... B05B 11/1023 222/336
6,685,062 B1 * 2/2004 Ki ....................... B05B 11/1025 222/321.9
7,938,298 B2 * 5/2011 Lee ..................... B05B 11/1074 222/321.2
9,248,462 B2 * 2/2016 Csaszar ............... B05B 11/1047
2004/0149777 A1 * 8/2004 Santagiuliana ..... B05B 11/1023 222/190
2007/0241135 A1 * 10/2007 Santagiuliana ..... B05B 11/1008 222/321.9
2017/0326567 A1 * 11/2017 Santagiuliana ......... B29C 45/44
2023/0074980 A1 * 3/2023 Zembrod ............ B05B 11/1023

* cited by examiner

*Primary Examiner* — Bob Zadeh
(74) *Attorney, Agent, or Firm* — B. Aaron Schulman, Esq.; Stites & Harbison, PLLC

(57) ABSTRACT

A pressing mechanism for miscellaneous packs dispensing fluidic products comprising a capsular body in which a hollow actuator stem is slidably mounted to perform downward and upward movements with the outflow and backflow provided by a bellows with an elastic memory. An upper end of the bellows is coupled to a corresponding part of the actuator stem by a locking ring, and is also coupled to a button/nozzle, while the lower end of the bellows is supported on the capsular body. The actuator stem is slidably guided by an annular cap, below which the lower end of the actuator stem is coupled to a piston and a first check valve, which, together with a second check valve, allows the actuation of the actuator stem.

9 Claims, 13 Drawing Sheets

COMPRESSIBLE MECHANISM FOR EXTRACTING FLUID PRODUCTS FOR A RANGE OF PACKAGING

FIELD OF THE INVENTION

More particularly, this invention refers to technical and functional improvements introduced to a particular type of pump with a bellows element with an elastic memory that, when activated, establishes sufficient internal pressure to displace the fluidic product from the inside to the outside of the pack, becoming an ideal mechanism for use in different packs of varied products in assorted states of aggregation, Notably liquid, oily, creamy and semi-solid, as it happens with several cosmetics, for either beautification or therapeutic purposes, or both, with some also known as cosmeceuticals, whose action is equivalent to medications.

STATE OF THE ART

At present, there are countless packs with resources similar to those mentioned above, as taught, for example, by documents: EP 1154863, U.S. Pat. Nos. 2,833,448, 4,732,549, 4,863,070, 4,915,601, 5,014,881, 5,238,156, 5,363,993, 5,518,147, 5,544,789, 5,673,824, 5,924,603, 6,193,112, 6,279,784, 6,672,486, 6,715,649, 7,246,723, US 201732656567, US 20030111551, WO 9628257 and WO 2012104694. Logically, each document describes a specific way in which a product may be extracted easily, always striving to provide more efficient ways of handling and controlling the pack and application of the product.

There is no doubt that the known mechanisms used for the above-mentioned purpose are sufficient for the product to be applied correctly. However, although mechanisms working with internal valves are efficient, it is noted that they could be improved considerably, as many of them use springs, balls, and all sorts of moving mechanical components that consequently constitute substantially complicated mechanisms, while the product is still not delivered in the desired manner, whereby this becomes a set of complicated industrial requirements for both the component fabrication process and the final assembly stage, making such devices overly expensive.

Notably, conventional devices do not present the desired efficiency when opening and closing, initially because they are complicated, and then because they are not always closed tightly, with the possibility of leakage that, even if minimal, causes waste. Similarly, if not efficiently sealed, air may enter the pack, with negative alterations to the product characteristics over time, due mainly to oxidation.

In many cases, the usual assemblies include the use of a spring or a similar component that often becomes somewhat inefficient during the functioning of the assembly.

PURPOSES OF THE INVENTION

The embodiment of a capsular body with several integrated parts, in other words, on the upper outer side, includes the means for leakproof assembly in the neck of any pack, while, on the inner side, it has a first integrated part consisting of a cylinder within which is a sliding piston and the respective tubular actuator stem, whose exposed upper end is connected to an actuating button/applicator nozzle, below which is affixed the upper end of an actuating bellows with elastic memory, whose lower end is slotted into and supported in the corresponding part of the capsular body, whereby the said shaft may be displaced downwards when the actuation button is pressed, returning automatically when the said button is no longer pressed. Consequently, the piston moves up and down in the same way, and these movements, together with lower valves, allow a dose of product to be positioned and placed under pressure in the chamber of the capsular body and, with this, the said dose of product travels up the tubular stem to be dispensed through the applicator button/nozzle.

DESCRIPTION OF THE DRAWINGS

For a better understanding of this invention, a detailed description of this invention is given below, with references to the drawings in the Annexes.

DETAILED DESCRIPTION OF THE INVENTION

Figure 1:
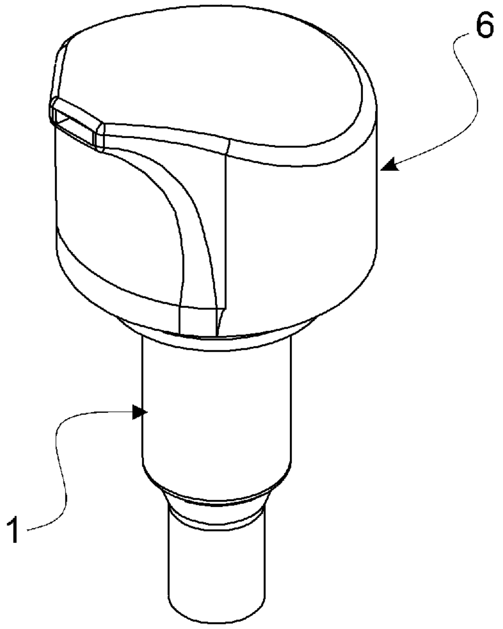
FIG. 1 presents a perspective showing the assembly mounted at an upper front angle.
Figure 2:
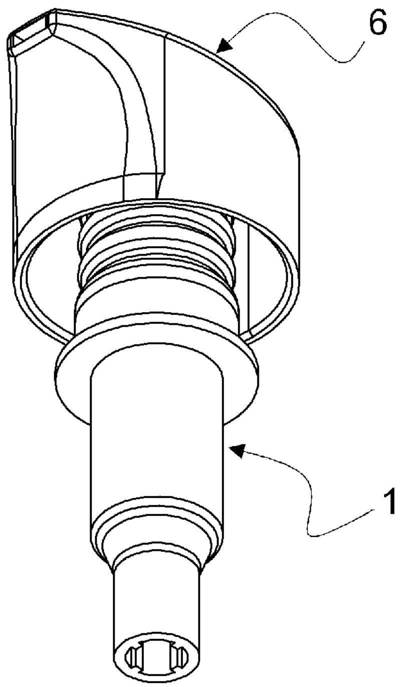
FIG. 2 shows a perspective with the assembly mounted at a lower front angle.
Figure 3:
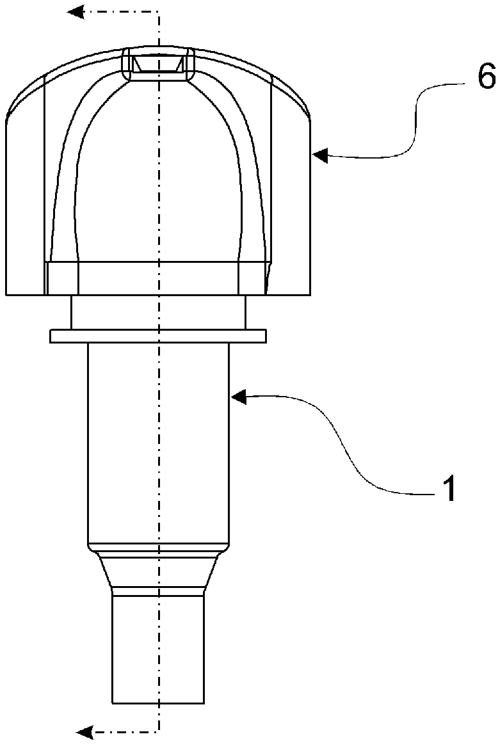
FIG. 3 illustrates a front elevation view with the indication of a cross-section line.
Figure 4:
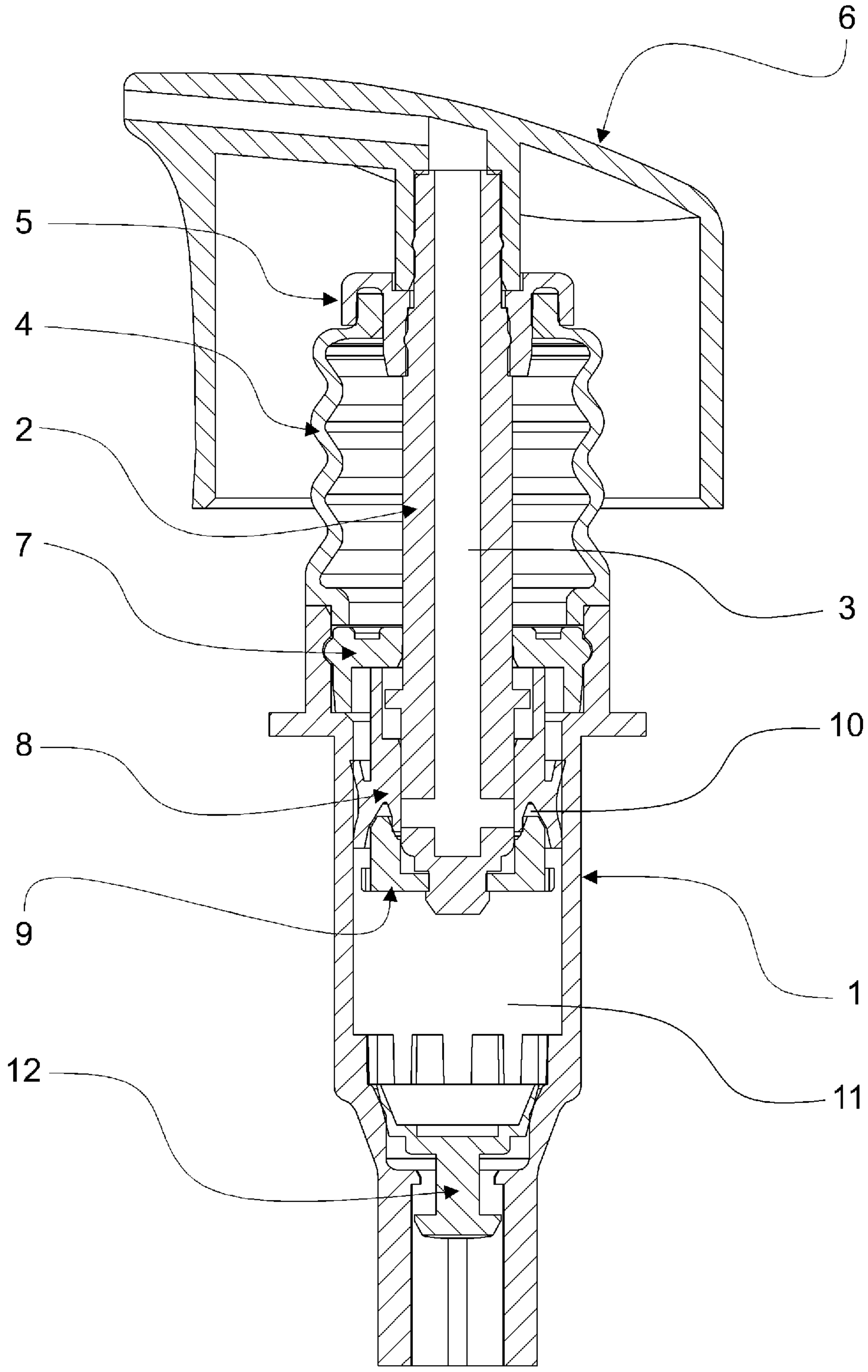
FIG. 4 is an enlarged view of the cross-section shown in FIG. 3.
Figure 5:
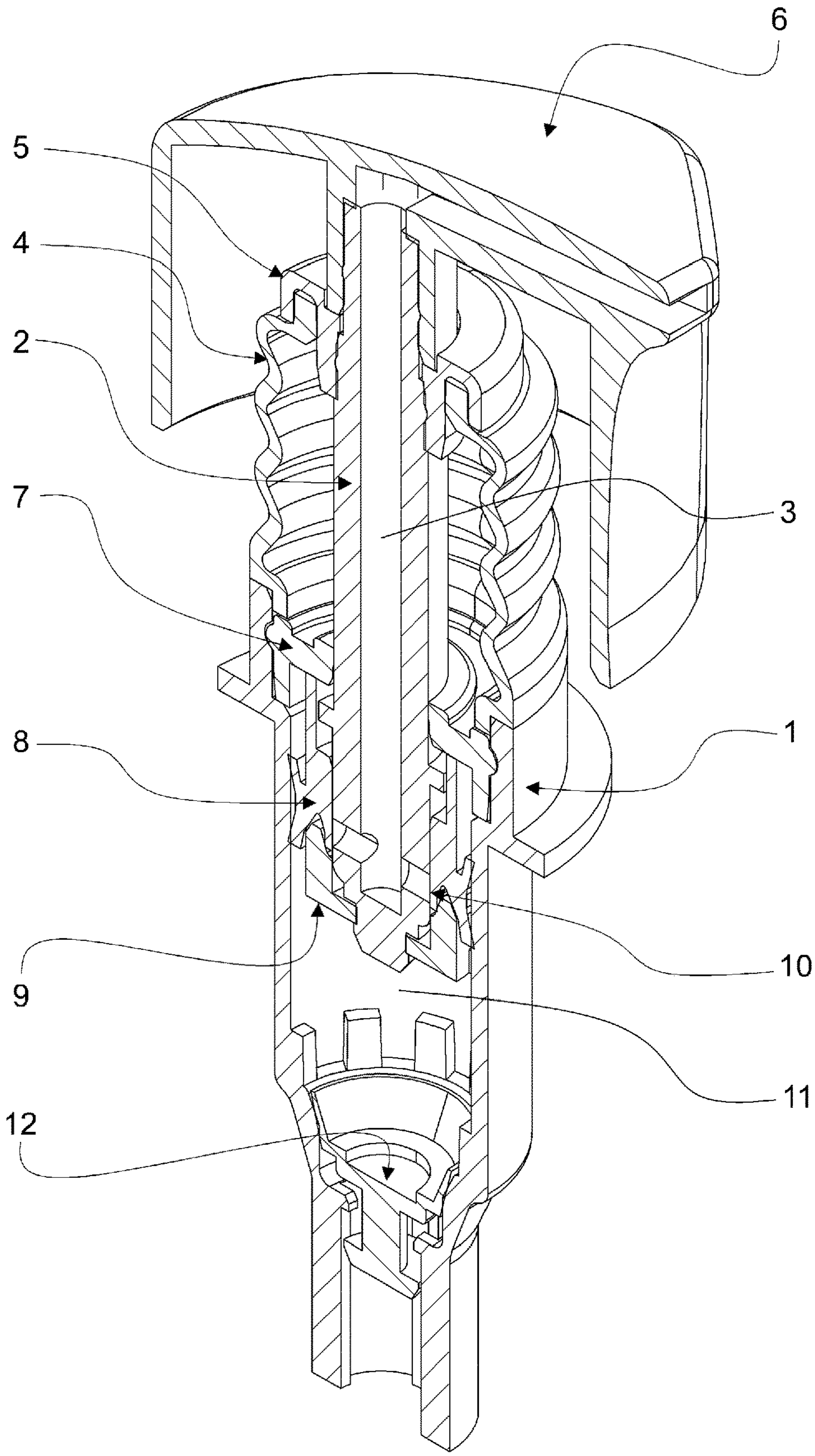
FIG. 5 shows an enlarged isometric view of the cross-section shown in FIG. 3.
Figure 6:
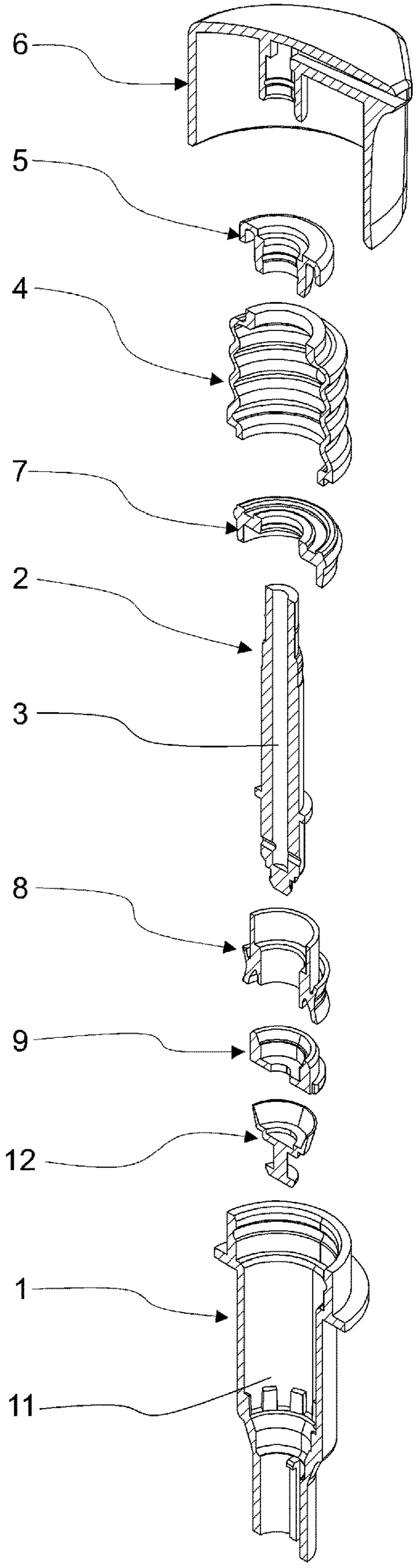
FIG. 6 presents an exploded view showing the assembly at an upper front angle, according to the cross-section shown in FIG. 3.
Figure 7:
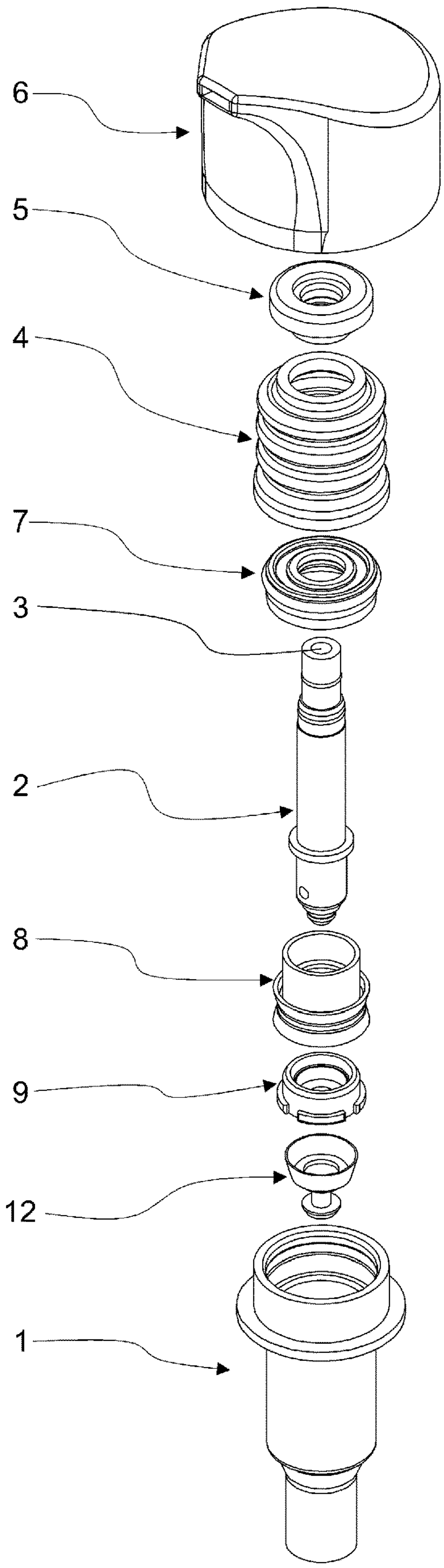
FIG. 7 is another exploded view, showing the assembly at an upper front angle.
Figure 8:
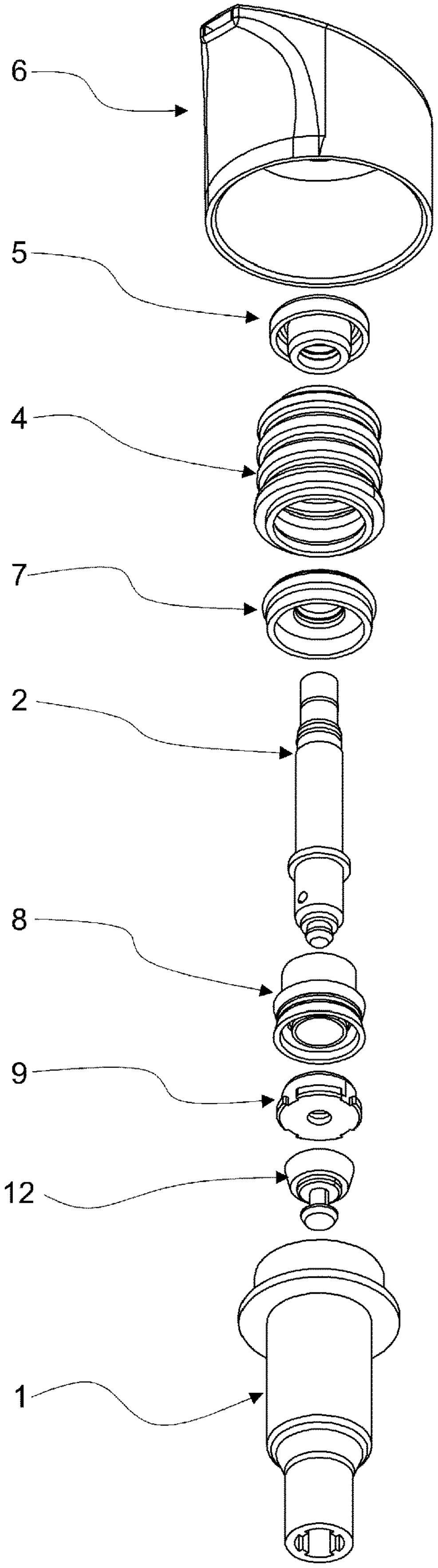
FIG. 8 shows another exploded view, with the assembly at a lower front angle.

As shown in these illustrations and their details, more particularly FIGS. 1 to 8, this invention of a PRESSING MECHANISM FOR MISCELLANEOUS PACKS DISPENSING FLUIDIC PRODUCTS, comprises a capsular body (1), tubular, in which is mounted a substantially hollow (3), actuator stem (2), slidably mounted to perform downward and upward movements with the outflow and backflow provided by a bellows (4) with an elastic memory, and having the upper end coupled to the corresponding part of the said actuator stem (2) by means of a locking ring (5), above which it is also coupled to a button/nozzle (6), while the lower end of the said bellows (4) is supported on the capsular body (1), where the said stem is slidably guided by an annular cap (7), locked into the internal diameter of the capsular body (1) and below which the lower end of the said actuator stem (2) is coupled to a piston (8) under which is a check valve (9), which can push or press in a leakproof manner on the lower side of the piston (8) to close or open a passageway (10) formed between the two parts, this passageway (10) in communication with the inner hollow part (3) of the said actuator stem (2) and with a chamber (11) that is in turn limited underneath by a second check valve (12), whose actuation is determined by positive or negative pressure. In other words, if negative, the product is sucked in and flows up and through the tubular lower end of the capsular body (1), forcing the said check valve (12) upwards and releasing the product for accumulation in the chamber (11). In the reverse situation, the pressure exerted by the piston (8) causes the said valve to close and the product flows through the passageway (10) up to the nozzle button (6).

Figure 9:
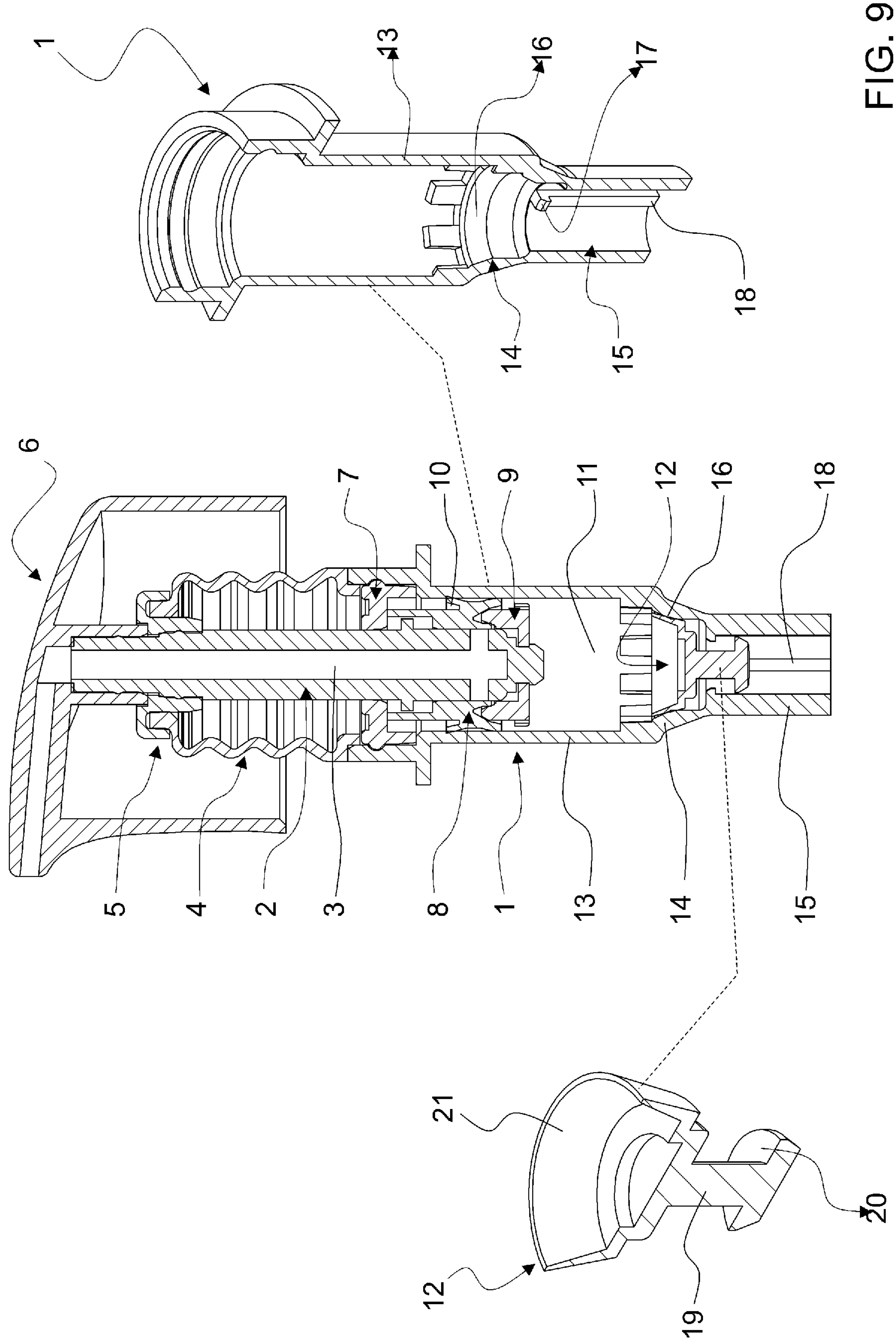
FIG. 9 presents a cross-section with enlarged details in perspective, highlighting the lower check valve and the device body.

As shown in FIG. 9, the capsular body (1) presents an intermediate tubular section forming a cylindrical sleeve (13) along which the piston (8) slides, with a tapered lower end (14), followed by another tubular section (15) with a smaller diameter, whereby the internal truncated-cone surface of the former constitutes a seal seat (16), below which there is a bottleneck in the form of radial teeth (17) extending downwards in strips (18), grasping the neck (19) of the said second check valve (12) whereby there is a circular stop (20) below this neck (18) that acts against the radial teeth (17) and between the strips (18), while on the upper side it has a truncated-cone sealing head (21) that tightly opens or closes the seal seat (16). To do so, the said neck (19) is tall enough for the said valve (12) to be displaced upwards or downwards in short movements, with these movements limited by the radial teeth (17), the circular stop (20), and the truncated-cone sealing head (21), establishing or interrupting the product flow when there is pressure or suction in the chamber (11).

Figure 10:
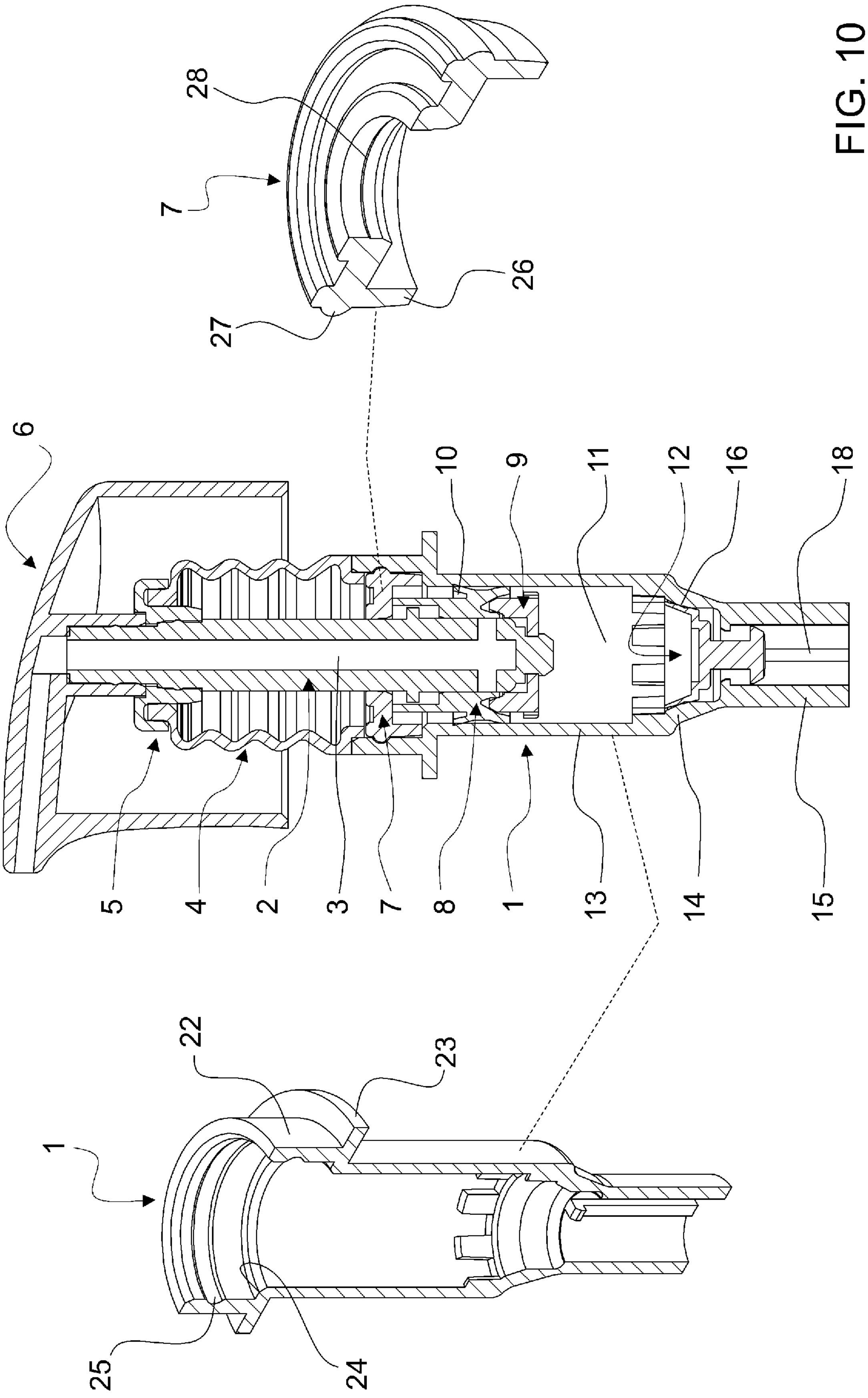
FIG. 10 shows a cross-section with enlarged details in perspective, highlighting the bellows support cover assembly.

As shown in FIG. 10, the capsular body (1) has an upper section that is equally tubular with a larger diameter (22), limited below by an external flange (23) and at this point forming an internal step (24), while the said larger diameter section (22) has an internal annular groove (25) that, together with the step (24), forms a slotting and locking device for the annular cap (7) that in turn has an external circular section (26) with an external and equally circular locking rib (27) that penetrates with interference into the annular groove (25), while on the inside the said annular cap (7) is pierced by guide hole (28) through which the actuator stem (2) slides.

Figure 11:
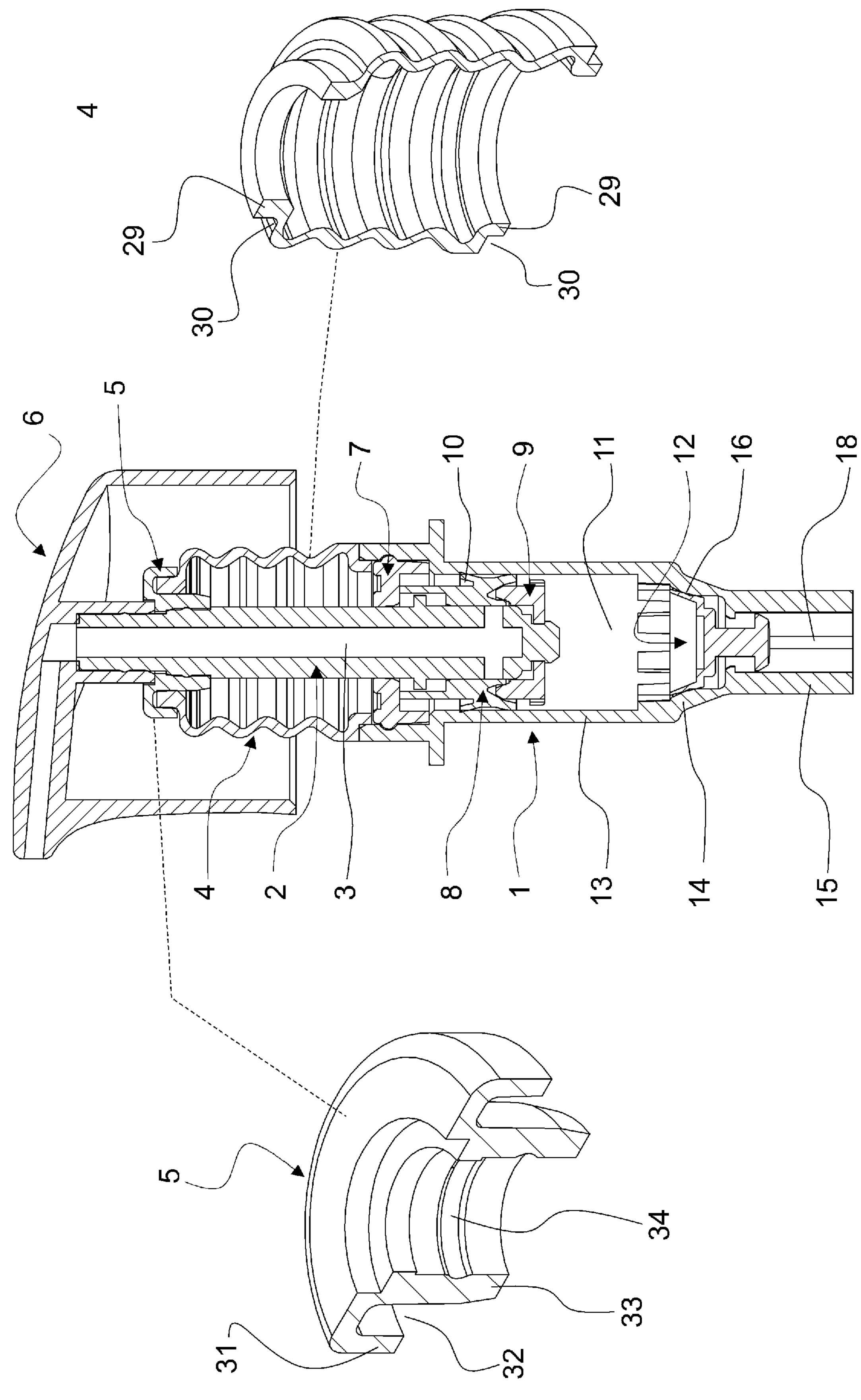
FIG. 11 shows a cross-section with enlarged details in perspective, highlighting the bellows.

As shown in FIG. 11, the ends of the bellows (4) are circular (29) and include corresponding steps (30), whereby the lower end may be fitted over the capsular body (1), where there is a corresponding step defined by the annular cap (7) that is slightly inset, while the upper end the said bellows is also fitted into the locking ring (5) that has a circular collar (31) for this purpose in an inverted "U" shape, which forms an equally circular fitting (32) for the upper end of the bellows (4), while the inner side has a tubular section (33) with a slotting and locking groove (34) for the corresponding end of the actuator stem (2), whereby the said locking ring (5) may be moved up and down together with the said actuator stem (2) whereby this movement also actuates the said bellows (4) establishing pressure or suction in the hollow part (3) of the actuator stem (2).

Figure 12:
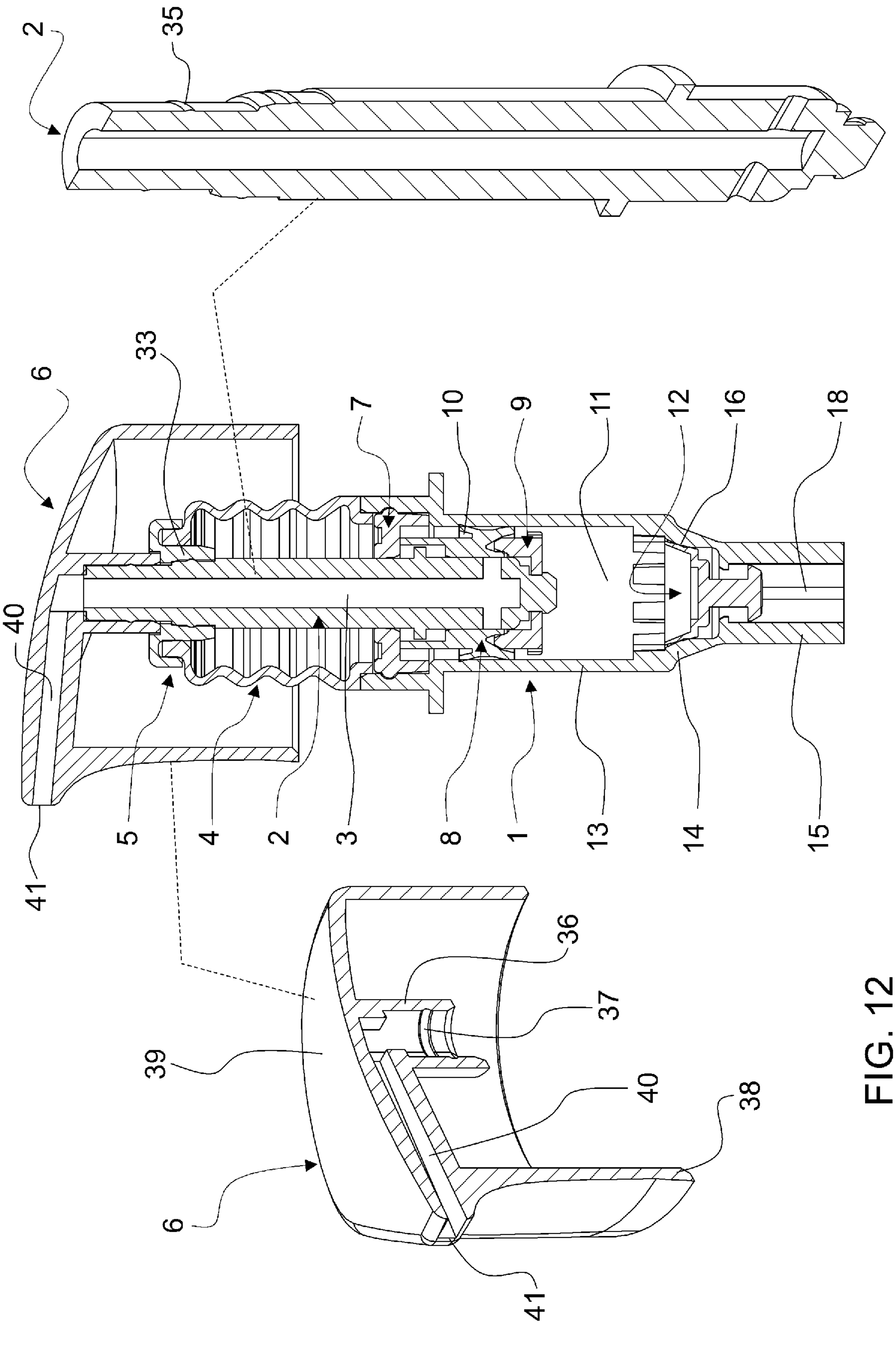
FIG. 12 shows a cross-section with enlarged details in perspective, highlighting the button/actuation nozzle of the device.

As shown in FIG. 12, the upper end of the actuator stem (2) is exposed above the locking ring (5) and its diameter in this segment includes an equally annular locking row (35) for the nozzle button (6) which has an internal tube (36) for this purpose, with an annular locking channel (37) on the annular strip (35), while the said button/nozzle has another concentric external wall (38) closed superiorly (39) and at this point has a horizontal inner channel (40) that ends radially in a nozzle (41), while the opposite side is connected to the interior of the tubular section (33) and the hollow part (3), thus forming the product outflow channel.

Figure 13:
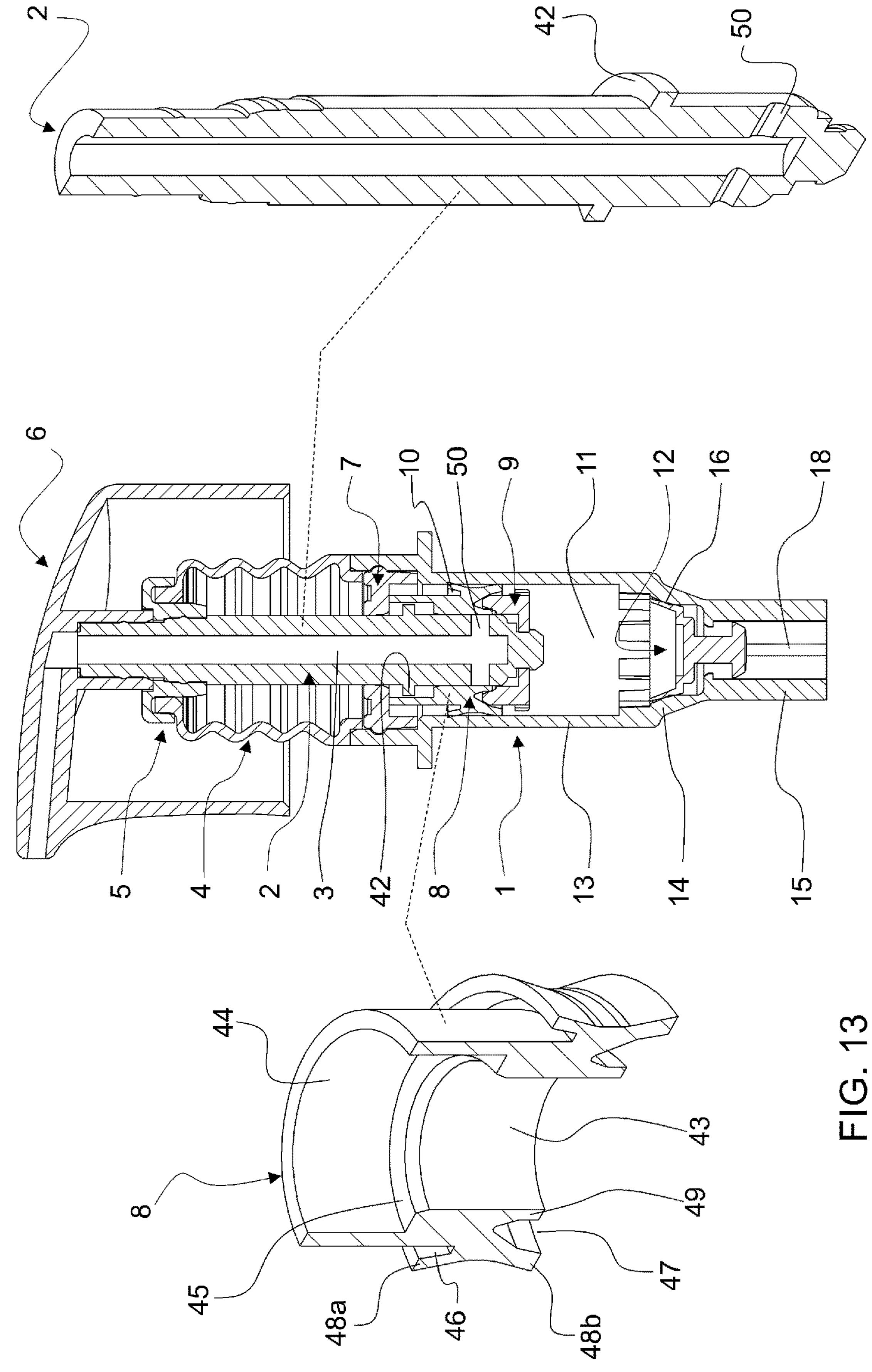
FIG. 13 illustrates a cross-section with enlarged details in perspective, highlighting the piston of the device.

As shown in FIG. 13, the lower third of the actuator stem (2) has a flange stop (42) below, which is a slidably mounted piston (8) that in turn has two internal diameters, one lower and smaller (43) and one larger and upper (44), which together form a step stop (45).

The lower smaller diameter (43) fits slidingly onto the said actuator stem (2), while the upper larger diameter (44) also fits slidingly around the stop flange (42) and with this, the said piston (8), in addition to sliding inside the cylindrical sleeve (13), is subjected to a brief up and down movement on the actuator stem (2), with this movement defined by the height of the upper larger diameter (44), together with the step stop (45).

The thicker lower part of the piston (8) has two "V" shaped channels, an upper channel (46) and a lower channel (47), which result in three annular sealing lips, with two on the outer diameter (48*a*-48*b*) and one on the inner diameter (49), with the latter positioned to open or close a transverse intermediate passage (50) at the lower end of the actuator stem (2) that connects the chamber (11) and the hollow part (3) of the said actuator stem (2), with the closing and opening movements defined by the stop flange (42) and the step stop (45), as well as the leakproof effect of the annular sealing lip is performed jointly with the check valve (9).

Figure 14:
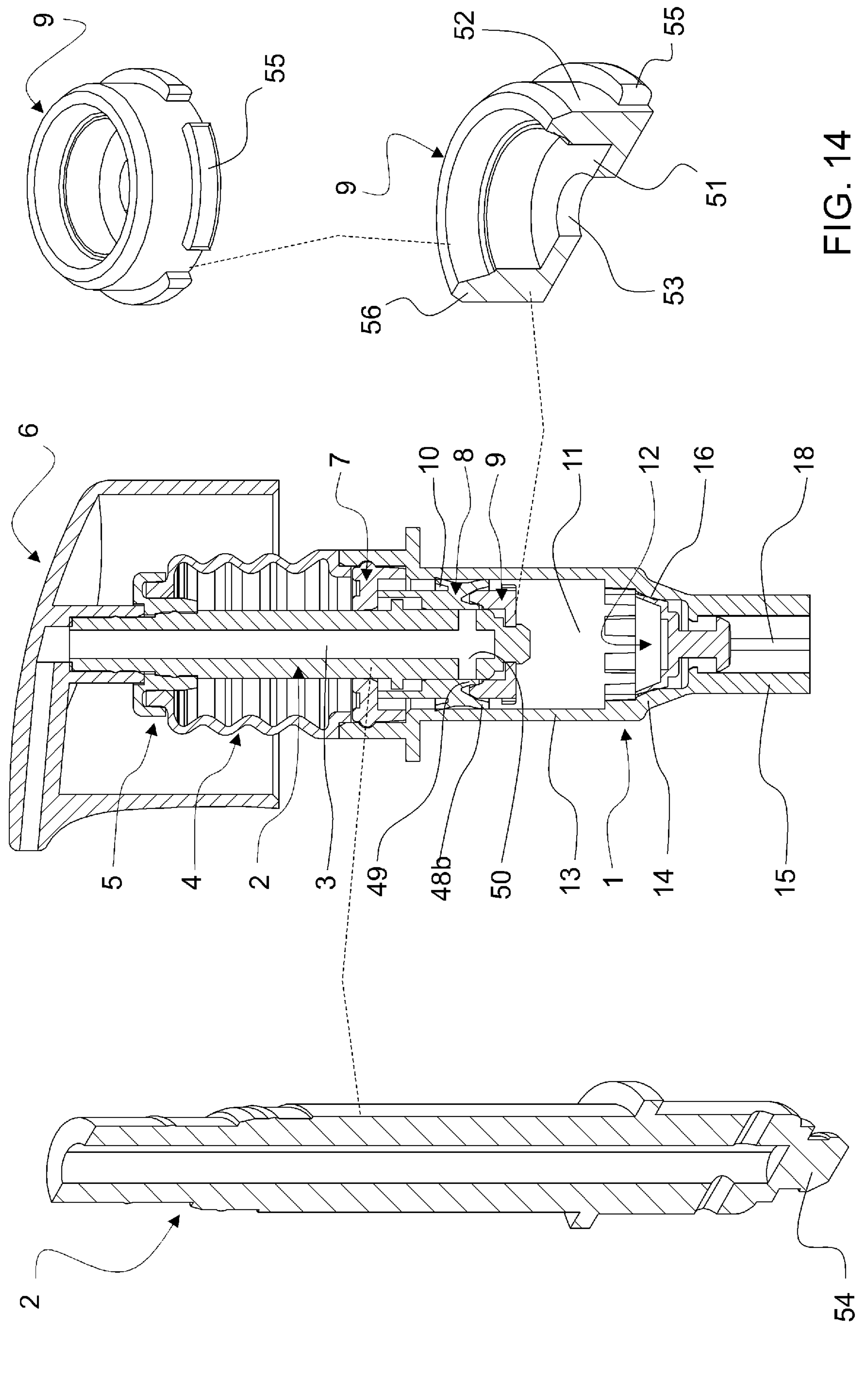
FIG. 14 shows a cross-section with enlarged details in perspective, highlighting another check valve of the device.

The check valve (9) is illustrated with details in FIG. 14, where it may be seen that it is ordinarily cup-shaped, having a bottom wall (51) and a cylindrical wall (52), with the former having a center hole (53) for slotting and holding the lower end of the actuator stem (2), which has a penetrating lock tip (52) to do so, while the base of the other cylindrical wall (52) has spacer segments (55) adjusted to the inner diameter of the cylindrical sleeve (13), allowing the product to pass between them.

The cylindrical wall (52) has a wedge-shaped upper edge (56) positioned to penetrate between the sealing lips (48*b*) and (49), thus exerting some pressure on the two lips in order to ensure that the intermediate passage (50) is leakproof.

Figure 16:
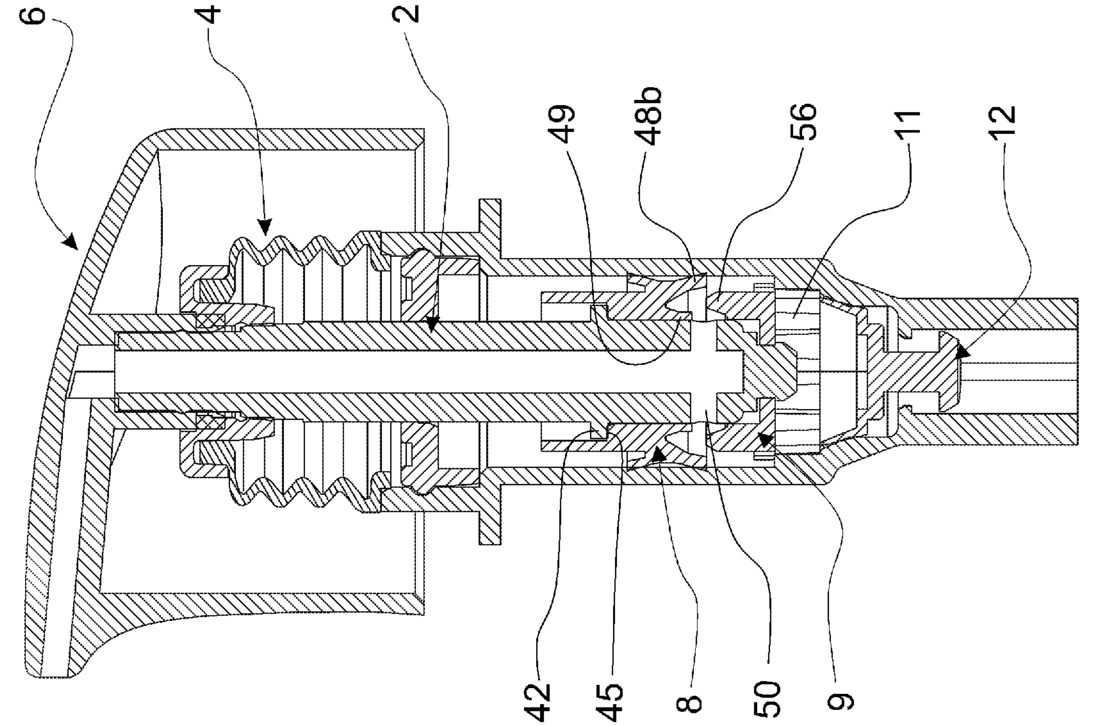
FIGS. 15 and 16 present the same section as shown in FIG. 3, but with the device actuated in FIG. 16, illustrating its functioning.
Figure 15:
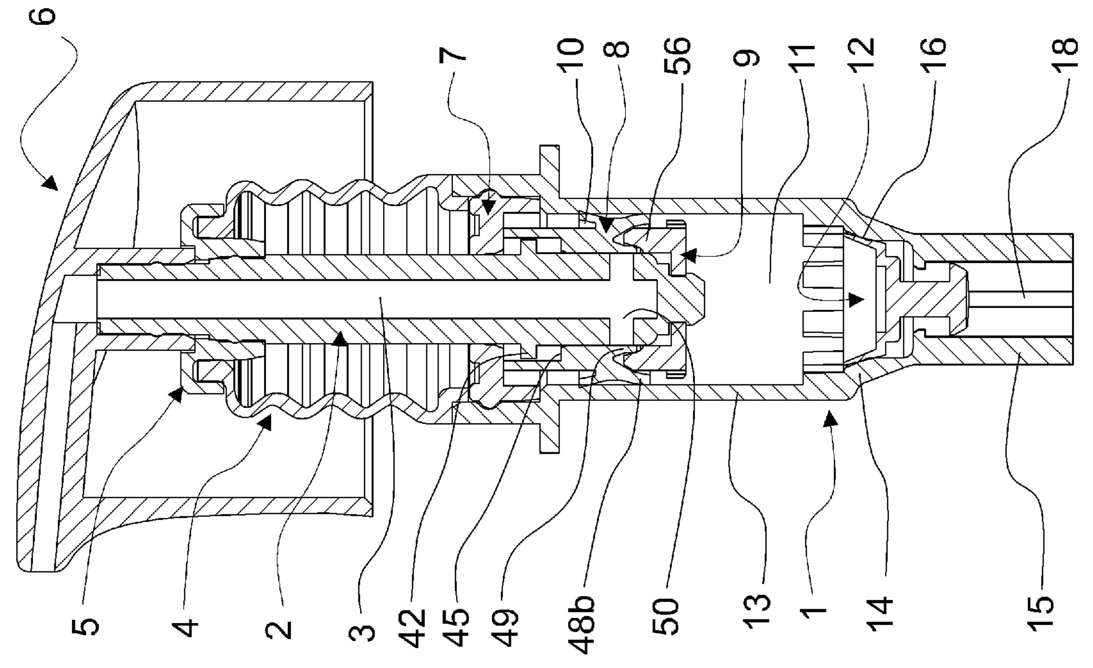

The functioning of the assembly is substantially simple, as illustrated in FIGS. 15 and 16, where the two main functioning conditions are shown. In FIG. 15 the device is at rest. In this condition, the chamber (11) is considered to be full of product, why the device is ready to be activated by simply pressing the button (6). In this actuation, FIG. 16, several movements occur concomitantly, starting with the contraction of the bellows (4) and the downward displacement of the actuator stem (2), with which the check valve (9) and the piston (8) also move. The latter starts to move downwards only at the moment its step (45) touches the flange (42) of the actuating stem (2) and at this moment its sealing lips (48*b*-49) push from the channel (50) and the wedge section (56) of the check valve, at which time the pressure gradually increases on the product in the chamber (11) with two other effects occurring at the same time in this case, the first being that increased pressure causes the other check valve (12) to press against its seal seat (16), preventing the product from flowing back into the bottle, with the second being that the gradual increase in pressure causes the product in the chamber (11) to flow past the gaps between the check valve (9) and the piston (8) into the channel (50)

and from there into the hollow part (3) continuing to a channel (40) to be dispensed through the nozzle (41), where the amount extracted is controlled by pressing the button (6). FIG. 16 shows the maximum pressure movement of the said button (6). In this position, when the button (6) is no longer pressed, the elastic memory of the bellows (4) causes the whole assembly to return to the position shown in FIG. 15, reversing all the functions described above, in other words, initially with the upward displacement of the actuating stem (2) and the wedge-shaped edge (56) of the check valve (9) slots back between the sealing lips (48*b* and 49), while the inner sealing lip (49) closes the passageway (10) tightly, so at this moment the piston (8) really starts to move upwards and, at this moment the suction phase continues in the chamber (11). With this, the check valve is brought to the open position, in other words, it moves upwards, allowing the product to be suctioned in the chamber (11), which is once again refilled for the next operation, as shown in FIG. 15.

The invention claimed is:

1. A pressing mechanism for dispensing a fluidic product comprising:

a capsular body having an inner wall;

a hollow actuator stem having an upper end and a lower end, and being slidably mounted within the capsular body;

a bellows with an elastic memory, the bellows having an upper end and a lower end, the lower end of the bellows being supported by the capsular body;

a locking ring coupling the upper end of the bellows to a corresponding part of the hollow actuator stem;

a button coupled to the upper end of the hollow actuator stem;

an annular cap within the capsular body that slidably guides the hollow actuator stem;

a piston coupled to the lower end of the hollow actuator stem;

a first check valve;

a second check valve;

a chamber defined by the first check valve, the inner wall of the capsular body and the second check valve; and a passageway formed between the first check valve and the piston, the passageway being in communication with the hollow actuator stem and the chamber;

wherein the second check valve is actuated by suction, such that when the fluidic product flows upwards and through a lower section of the capsular body, the second check valve is displaced upwardly and the fluidic product accumulates in the chamber, or by pressure, such that pressure exerted by the piston causes the second check valve to close, with the fluidic product flowing through the passageway to the button;

wherein the second check valve comprises:

a truncated cone sealing head;

a neck; and a circular stop below the neck;

wherein the capsular body comprises:

an intermediate section forming a cylindrical sleeve along which the piston slides, with a tapered lower end comprising a seal seat, the seal seat being opened and closed by the truncated cone sealing head; and the lower section, having a diameter smaller than a diameter of the intermediate section and radial teeth extending down a length of the lower section in strips, forming a bottleneck that grasps the neck of the second check valve; and wherein the neck has a height that enables the second check valve to be displaced upward and downward to establish or interrupt flow of the fluidic product, with movement of the second check valve limited by the radial teeth, the circular stop and the truncated cone sealing head.

2. The pressing mechanism according to claim 1, wherein the capsular body comprises:

an upper section and the lower section, the upper section having a diameter greater than a diameter of the lower section; and an external flange between the upper section and the lower section, forming an internal step; and wherein the upper section has an annular groove that, together with the internal step, forms a slotting and locking device for the annular cap, the annular cap having an external circular section with an external circular locking rib that interlocks with the annular groove, the annular cap further comprising a guide hole through which the hollow actuator stem slides.

3. The pressing mechanism according to claim 1, wherein the upper end and the lower end of the bellows are circular and comprise corresponding steps, whereby the lower end of the bellows is fitted over the capsular body and into a corresponding, inset step in the annular cap;

wherein the locking ring has a circular, inverted U-shaped collar forming a circular fitting that receives the upper end of the bellows, and a tubular section with a slotting and locking groove for receiving the corresponding end of the hollow actuator stem; and wherein when the locking ring moves upwards and downwards together with the hollow actuator stem, movement of the locking ring actuates the bellows to create pressure or suction in the hollow actuator stem.

4. The pressing mechanism according to claim 1, wherein the upper end of the hollow actuator stem extends above the locking ring, the upper end of the hollow actuator stem having an annular locking row; and wherein the button comprises:

an internal tube;

an annular locking channel that corresponds with the annular locking row;

a concentric external wall with a closed top; and a horizontal inner channel that ends radially in a nozzle at a first end, while a second end is connected to the hollow actuator stem, thus forming an outflow channel of the fluidic product.

5. The pressing mechanism according to claim 1, wherein the lower end of the actuator stem has a stop flange;

wherein the piston has an upper portion and a lower portion, the upper portion of the piston having a first internal diameter and the lower portion of the piston having a second internal diameter, the first internal diameter being greater than the second internal diameter so as to form a step stop;

wherein the lower portion of the piston fits slidingly onto the hollow actuator stem and the upper portion of the piston fits slidingly around the stop flange, such that the piston is movable along the actuator stem, with movement of the piston defined by a height of the upper portion of the piston together with the step stop;

wherein the lower portion of the piston further comprises:

an upper V-shaped channel and a lower V-shaped channel, each of the upper and the lower V-shaped channels having an outer diameter and an inner diameter;

a first annular sealing lip along the outer diameter of the upper V-shaped channel;

a second annular sealing lip along the outer diameter of the lower V-shaped channel;
a third annular sealing lip along the inner diameter of the lower V-shaped channel, the third annular sealing lip being positioned to open and close a transverse intermediate passage at the lower end of the hollow actuator stem that connects the chamber and the hollow actuator stem;
wherein movement to open and close the transverse intermediate passage is defined by the stop flange and the step stop; and
wherein the first, second and third annular sealing lips, together with the first check valve, prevent leakage of the fluidic product.

6. The pressing mechanism according to claim 5, wherein the first check valve comprises:
a bottom having a center hole for slotting and holding a penetrating lock tip at the lower end of the hollow actuator stem; and
a cylindrical wall having a base and a wedge-shaped upper edge, the base having spacer segments sized such that the fluidic product is able to pass between the spacer segments and the inner wall of the capsular body, the wedge-shaped upper edge positioned to penetrate between and exert pressure on the second and third annular sealing lips to ensure that the transverse intermediate passage is leak proof.

7. A pressing mechanism for dispensing a fluidic product comprising:
a capsular body having an inner wall;
a hollow actuator stem having an upper end and a lower end, and being slidably mounted within the capsular body;
a bellows with an elastic memory, the bellows having an upper end and a lower end, the lower end of the bellows being supported by the capsular body;
a locking ring coupling the upper end of the bellows to a corresponding part of the hollow actuator stem;
a button coupled to the upper end of the hollow actuator stem;
an annular cap within the capsular body that slidably guides the hollow actuator stem;
a piston coupled to the lower end of the hollow actuator stem;
a first check valve;
a second check valve;
a chamber defined by the first check valve, the inner wall of the capsular body and the second check valve; and
a passageway formed between the first check valve and the piston, the passageway being in communication with the hollow actuator stem and the chamber;
wherein the second check valve is actuated by suction, such that when the fluidic product flows upwards and through a lower section of the capsular body, the second check valve is displaced upwardly and the fluidic product accumulates in the chamber, or by pressure, such that pressure exerted by the piston causes the second check valve to close, with the fluidic product flowing through the passageway to the button;
wherein the upper end and the lower end of the bellows are circular and comprise corresponding steps, whereby the lower end of the bellows is fitted over the capsular body and into a corresponding, inset step in the annular cap;
wherein the locking ring has a circular, inverted U-shaped collar forming a circular fitting that receives the upper end of the bellows, and a tubular section with a slotting and locking groove for receiving the corresponding end of the hollow actuator stem; and
wherein when the locking ring moves upwards and downwards together with the hollow actuator stem, movement of the locking ring actuates the bellows to create pressure or suction in the hollow actuator stem.

8. A pressing mechanism for dispensing a fluidic product comprising:
a capsular body having an inner wall;
a hollow actuator stem having an upper end and a lower end, and being slidably mounted within the capsular body;
a bellows with an elastic memory, the bellows having an upper end and a lower end, the lower end of the bellows being supported by the capsular body;
a locking ring coupling the upper end of the bellows to a corresponding part of the hollow actuator stem;
a button coupled to the upper end of the hollow actuator stem;
an annular cap within the capsular body that slidably guides the hollow actuator stem;
a piston coupled to the lower end of the hollow actuator stem;
a first check valve;
a second check valve;
a chamber defined by the first check valve, the inner wall of the capsular body and the second check valve; and
a passageway formed between the first check valve and the piston, the passageway being in communication with the hollow actuator stem and the chamber;
wherein the second check valve is actuated by suction, such that when the fluidic product flows upwards and through a lower section of the capsular body, the second check valve is displaced upwardly and the fluidic product accumulates in the chamber, or by pressure, such that pressure exerted by the piston causes the second check valve to close, with the fluidic product flowing through the passageway to the button;
wherein the lower end of the actuator stem has a stop flange;
wherein the piston has an upper portion and a lower portion, the upper portion of the piston having a first internal diameter and the lower portion of the piston having a second internal diameter, the first internal diameter being greater than the second internal diameter so as to form a step stop;
wherein the lower portion of the piston fits slidingly onto the hollow actuator stem and the upper portion of the piston fits slidingly around the stop flange, such that the piston is movable along the actuator stem, with movement of the piston defined by a height of the upper portion of the piston together with the step stop;
wherein the lower portion of the piston further comprises:
an upper V-shaped channel and a lower V-shaped channel, each of the upper and the lower V-shaped channels having an outer diameter and an inner diameter;
a first annular sealing lip along the outer diameter of the upper V-shaped channel;
a second annular sealing lip along the outer diameter of the lower V-shaped channel;
a third annular sealing lip along the inner diameter of the lower V-shaped channel, the third annular sealing lip being positioned to open and close a transverse intermediate passage at the lower end of the hollow actuator stem that connects the chamber and the hollow actuator stem;

wherein movement to open and close the transverse intermediate passage is defined by the stop flange and the step stop; and wherein the first, second and third annular sealing lips, together with the first check valve, prevent leakage of the fluidic product.

9. The pressing mechanism according to claim 8, wherein the first check valve comprises:

a bottom having a center hole for slotting and holding a penetrating lock tip at the lower end of the hollow actuator stem; and a cylindrical wall having a base and a wedge-shaped upper edge, the base having spacer segments sized such that the fluidic product is able to pass between the spacer segments and the inner wall of the capsular body, the wedge-shaped upper edge positioned to penetrate between and exert pressure on the second and third annular sealing lips to ensure that the transverse intermediate passage is leak.

* * * * *